(12) United States Patent
Schreiber (10) Patent No.: US 12,536,667 B2
(45) Date of Patent: Jan. 27, 2026

(54) METHOD AND FACILITY FOR SEGMENTATION OF HIGH-CONTRAST OBJECTS IN X-RAY IMAGES (71) Applicant: Siemens Healthcare GmbH, Erlangen (DE)

(72) Inventor: Bernd Schreiber, Forchheim (DE)

(73) Assignee: Siemens Healthineers AG, Forchheim (DE)

( * ) Notice: Subject to any disclaimer, the term of this patent is extended or adjusted under 35 U.S.C. 154(b) by 601 days.

(21) Appl. No.: 17/945,100

(22) Filed: Sep. 15, 2022

(65) Prior Publication Data

US 2023/0089510 A1  Mar. 23, 2023

(30) Foreign Application Priority Data

Sep. 17, 2021  (DE) ...................... 10 2021 210 356.1

(51) Int. Cl.
*G06T 7/11* (2017.01)
*G06T 7/136* (2017.01)

(52) U.S. Cl.
CPC .............. *G06T 7/11* (2017.01); *G06T 7/136* (2017.01); *G06T 2207/10116* (2013.01); *G06T 2207/30004* (2013.01)

(58) Field of Classification Search
CPC . G06T 2207/10116; G06T 2207/10081; G06T 11/008; G06T 7/136; G06T 2207/30004; G01V 5/222
See application file for complete search history.

(56) References Cited

U.S. PATENT DOCUMENTS

| 6,349,113 B1* | 2/2002 | Mech .................. G06V 10/273 348/700 |
| 2012/0019512 A1* | 1/2012 | Yang ..................... G06T 11/005 382/154 |

(Continued)

OTHER PUBLICATIONS

Gustaf Ullman , Michael Sandborg , David R. Dance , Roger Hunt , Gudrun Alm Carlsson Distributions of scatter-to-primary and signal-to-noise ratios per pixel in digital chest imaging Radiation Protection Dosimetry, vol. 114, Issue 1-3, May 17, 2005, pp. 355-358, https://doi.org/10.1093/rpd/nch530 (Year: 2005).*

(Continued)

*Primary Examiner* — Sumati Lefkowitz
*Assistant Examiner* — Wayne Zhang
(74) *Attorney, Agent, or Firm* — Lempia Summerfield Katz LLC (57) ABSTRACT

A method for segmentation of high-contrast objects in X-ray images includes receiving an X-ray projection image through an interface. The X-ray projection image includes a plurality of pixels. An image processing processor determines, for one or more pixels of the received X-ray projection image, whether the respective pixel is a shadow pixel representing a projection mapping of a high-contrast object. High-contrast object segmentation of one or more high-contrast objects is generated for the X-ray projection image based on the shadow pixels. The determination of shadow pixels includes, for the respective pixel of the received X-ray projection image, determining a ratio of the scattered radiation intensity to be assigned to the primary radiation intensity to be assigned to the pixel, comparing the ratio with a scatter-primary threshold value, and classifying the pixel, wherein the pixel is classified as a shadow pixel if the ratio is greater than the scatter-primary threshold value.

18 Claims, 3 Drawing Sheets

(56) References Cited

U.S. PATENT DOCUMENTS

2018/0074154 A1* 3/2018 Lane ................ G01S 3/7867
2020/0250820 A1* 8/2020 Kunze ............... G06T 7/10
2023/0007835 A1* 1/2023 Ratcliffe ............ G06T 5/90

OTHER PUBLICATIONS

Gustav Ullman, Michael Sandborg, David R Dance, Roger Hunt and Gudrun Alm Carlsson Distributions of scatter-to-primary ratios in chest PA radiography using grid or air gap for scatter-rejection Series: Report / Institutionen för radiologi, Universitetet i Linköping; 100 ISRN: LIU-RAD-R-100 (Year: 2004).*

Gustaf Ullman , Michael Sandborg , David R. Dance , Roger Hunt , Gudrun Alm Carlsson Distributions of scatter-to-primary and signal-to-noise ratios per pixel in digital chest imaging Radiation Protection Dosimetry (Year: 2005).*

Gjesteby, Lars, et al. "Metal artifact reduction in CT: where are we after four decades?." Ieee Access 4 (2016): 5826-5849.

Glover, G. H. "Compton scatter effects in CT reconstructions." Medical physics 9.6 (1982): 860-867.

Prell, D., W. A. Kalender, and Y. Kyriakou. "Development, implementation and evaluation of a dedicated metal artefact reduction method for interventional flat-detector CT." The British journal of radiology 83.996 (2010): 1052-1062.

* cited by examiner

METHOD AND FACILITY FOR SEGMENTATION OF HIGH-CONTRAST OBJECTS IN X-RAY IMAGES

This application claims the benefit of German Patent Application No. DE 10 2021 210 356.1, filed on Sep. 17, 2021, which is hereby incorporated by reference in its entirety.

BACKGROUND

The present embodiments relate to a method, a facility, and a computer program product for segmentation of high-contrast objects in X-ray images.

High-contrast objects may cause serious image errors (e.g., artifacts) in X-ray images. High-contrast objects may, for example, be metal objects. Image errors caused by metal objects are also referred to as metal artifacts. Hereinafter, for the sake of simplicity, high-contrast objects are also referred to as metal objects and, for the sake of simplicity, image errors caused by high-contrast objects are also referred to as metal artifacts, regardless of whether the high-contrast objects are actually metal objects.

In X-ray projection images, the high X-ray density of high-contrast objects provides that the limited dynamic range of present-day X-ray detectors does not allow complete mapping of the image information available in principle. Either dark image areas are depicted as high-contrast, but then high-contrast objects and the immediate image environment thereof appear cross-illuminated and without contrast. Alternatively, light image areas are depicted as high-contrast, but then dark image areas in which, for example, anatomical image information of a human body may be imaged appear dark and without contrast.

Problems due to metal artifacts also occur with 3D reconstruction of X-ray images (e.g., in computed tomography (also referred to as rotational computed tomography), C-arm computed tomography (also referred to as cone beam computed tomography), tomosynthesis, or symbolic 3D reconstruction). In the case of 3D reconstruction based on X-ray projection images with metal artifacts, linear, striated, or annular artifacts may occur, for example.

Metal artifacts may significantly reduce the diagnostic value of X-ray projection images and 3D X-ray images. For example, metal artifacts may make reliable detection of bleeding impossible. This problem may have a particularly serious impact on the detection of bleeding associated with stroke in the presence of an aneurysm that has already been treated with metallic coils. A further example of problems due to metal artifacts is surgical orthopedic treatment with metallic implants (e.g., nails, screws, or plates). Correct placement of the implants as well as subsequent verification of the outcome of the treatment may be significantly impeded.

To reduce metal artifacts in X-ray images, it is customary to perform metal artifact reduction. Algorithms for metal artifact reduction may at least partially suppress metal artifacts. Common algorithms for metal artifact reduction in 3D reconstruction of X-ray images use the following basic approach. A first, artifact-laden, 3D reconstruction is performed. Metal objects are segmented in the 3D X-ray image based on brightness/intensity threshold values (e.g., thresholding). A forward projection of the metal objects is performed. This identifies image pixels lying in the shadow of metal objects with respect to the primary beam (hereinafter, for the sake of simplicity, also referred to as shadow pixels). Herein, a primary beam may be an X-ray beam that runs in a straight line from the X-ray source to the X-ray image detector. Since the intensity values (also gray values) of shadow pixels are distorted by metal objects and therefore cause artifacts, the intensity values are replaced with interpolated values. The interpolation is based on the gray values of neighboring pixels adjacent to the metal object. After the replacement of the gray values with interpolated values, a second 3D reconstruction is performed, which may be enhanced with respect to metal artifacts. The segmented metal objects are reinserted into the second, metal artifact-reduced, 3D reconstruction.

SUMMARY AND DESCRIPTION

The scope of the present invention is defined solely by the appended claims and is not affected to any degree by the statements within this summary.

Although the usual algorithms for metal artifact reduction are quite effective, there is a need to further improve image quality. For example, when metal objects lie partially or completely outside a fully reconstructable volume during a three-dimensional (3D) reconstruction of X-ray images, the usual algorithms may fail. The main reason for this is that pixels in the shadow of metal objects lying outside the reconstructable volume cannot be determined by segmentation and subsequent forward projection of the metal objects.

The present embodiments may obviate one or more of the drawbacks or limitations in the related art. For example, segmentation of high-contrast objects in X-ray projection images are made more reliable. As another example, the segmentation of high-contrast objects in image data sets of X-ray projection images are made more reliable for three-dimensional (3D) reconstruction. As yet another example, image errors caused by high-contrast objects are reduced in 3D reconstructed X-ray images.

The present embodiments provide a computer-implemented method for segmentation of a high-contrast object in an X-ray image including receiving an X-ray projection image through an interface. The X-ray projection image includes a plurality of pixels. The computer-implemented method includes determining, by an image processing processor, for one or more pixels of the received X-ray projection image, whether the respective pixel is a shadow pixel representing a projection mapping of a high-contrast object. High-contrast object segmentation of one or more high-contrast objects is generated for the X-ray projection image based on the shadow pixels. The determination of shadow pixels includes, for the respective pixel of the received X-ray projection image, determining a ratio of the scattered radiation intensity to be assigned to the pixel to the primary radiation intensity to be assigned to the pixel. The ratio is compared with a scatter-primary threshold value, and the pixel is classified. The pixel is classified as a shadow pixel if the ratio is greater than the scatter-primary threshold value.

Primary radiation may be X-radiation that runs in a straight line from the X-ray source to the X-ray image detector. Primary radiation passing through an object is attenuated by the object. Scattered radiation may be X-radiation that is deflected (e.g., scattered) by an object. Therefore, scattered radiation does not run in a straight line from the X-ray source to the X-ray image detector. In a detector pixel, primary radiation and scattered radiation are added together to form the total intensity. This results in the brightness or the gray-value of the respective image pixel.

According to the present embodiments, high-contrast objects are analyzed in X-ray projection images and not in reconstructed 3D X-ray images. Therefore, a criterion is required to detect shadow pixels. This criterion is the ratio of scattered radiation to primary radiation (e.g., scatter-primary ratio). For a shadow pixel, it is to be provided that this ratio is to be above a threshold value. The threshold value may, for example, be ascertained statistically.

The following is intended to explain the ratio of scattered radiation to primary radiation and to describe the criterion in an understandable manner.

The following intensity values are given for each pixel (x,y) of an X-ray projection image:
Intensity of primary radiation: $I_P(x,y)$
Intensity of scattered radiation: $I_S(x,y)$
Total intensity: $I_T(x,y)$
Thus:

$$I_T(x,y)=I_P(x,y)+I_S(x,y)$$

Based on the maximum intensity $I_0$ achieved when there is no object in the X-ray beam, normalized intensities P(x,y), S(x,y), and T(x,y) may be introduced:

$$P(x,y)=I_P(x,y)/I_0$$

$$S(x,y)=I_S(x,y)/I_0$$

$$T(x,y)=I_T(x,y)/I_0$$

Thus:

$$T(x,y)=P(x,y)+S(x,y)$$

For each pixel (x,y), the line integral value p(x,y) and t(x,y) is introduced. Thus:

$$I_P(x,y)=I_0*e^{(-p(x,y))} \leftrightarrow p(x,y)=-\ln P(x,y)$$

$$I_T(x,y)=I_0*e^{(-t(x,y))} \leftrightarrow t(x,y)=-\ln T(x,y)$$

Thus, the scatter-to-primary radiation ratio $\zeta(x,y)$ for each pixel (x,y) is:

$$\zeta(x,y)=I_S(x,y)/I_P(x,y)=S(x,y)/P(x,y)$$

The use of the line integral values t(x,y) (e.g., with scattered radiation) and p(x,y) (e.g., without scattered radiation) enables the following equation for $\zeta(x,y)$ to be derived:

$$p(x,y)=t(x,y)+\ln(1+\zeta(x,y))$$

This equation may also be written as follows:

$$\zeta(x,y)=e^{(p(x,y)-t(x,y))}-1$$

For example, in cone beam computed tomography, X-ray projection images may have a high proportion of scattered radiation, even if a scattered radiation grid is used. Therefore, as a rule, scattered radiation correction is applied. The input for the scattered radiation correction is the line integral value t(x,y), which contains contributions of scattered radiation. The result is the line integral value p(x,y) containing (as far as possible) no contributions of scattered radiation. Thus, the scatter-to-primary radiation ratio $\zeta(x,y)$ may be calculated for each pixel (x,y) based on the equations explained above.

An embodiment provides that a mean value is used as a basis for the scatter-primary threshold value. For this purpose, first, the scatter-to-primary radiation ratio $\zeta(x,y)$ is calculated for at least two pixels of the X-ray projection image. The at least two pixels may be taken from either the entire X-ray projection image or a subarea thereof to be assigned to the respective pixel. All pixels of the X-ray projection image or of the subarea may be used as the basis, but it is also possible for only a respective subset to be used as the basis. If a subset is used as the basis, this may, for example, be selected at random, or the subset may be selected according to a schematic selection rule (e.g., by selecting every nth pixel). A subarea of the X-ray projection image to be assigned to a respective pixel may, for example, be based on a division of the image into 3×3 rectangular image areas.

The mean value $\zeta_{Mean}$ may be formed based on the scatter-to-primary radiation ratios $\zeta(x,y)$ calculated for the at least two pixels. The mean value $\zeta_{Mean}$ is formed either for the entire X-ray projection image or, if subareas have been formed, for the subarea to be assigned to the pixel. For shadow pixels, a low contribution of primary radiation may be assumed since a high-contrast object absorbs a high proportion of the primary radiation. Therefore, the scatter-to-primary radiation ratio $\zeta(x,y)$ is to be large for shadow pixels. As a criterion, the scatter-to-primary radiation ratio $\zeta(x,y)$ is to be greater than a threshold value formed from the mean value $\zeta_{Mean}$:

$$\zeta(x,y) \geq \tau_\zeta * \zeta_{Mean}.$$

Herein, the factor $\tau_\zeta$ may be selected as greater than 1 (e.g., $\tau_\zeta=3$). Generally, $\zeta(x,y)$ only varies relatively weakly and, for many pixels, only differs slightly from the mean value $\zeta_{Mean}$. High-contrast objects such as metal are the exception due to a very strong absorption of primary radiation. Therefore, in the shadow area of high-contrast objects, $\zeta(x,y)$ is generally significantly greater than $\zeta_{Mean}$. The optimal $\tau_\zeta$ for a specific body region may be obtained empirically by parameter optimization using suitable clinical data. Optimization may take place either interactively or in an automated manner (e.g., with deep learning). A suitable value for $\tau_\zeta$ may, for example, also be found based on previous experience or by individual trial and error with respect to the individual X-ray projection image or image data set, or taken from tables or databases.

In one development of the present embodiments, the determination of shadow pixels also includes, for one or more pixels of the received X-ray projection image: determining a primary radiation line integral to be assigned to the respective pixel; determining a primary radiation line integral mean value to be assigned to the image environment of the respective pixel; determining a standard deviation to be assigned to the primary radiation line integral mean value; determining an image environment threshold value by adding together the primary radiation line integral mean value and the standard deviation; comparing the primary radiation line integral with the image environment threshold value; and classifying the respective pixel, where the pixel is classified as a shadow pixel if the primary radiation line integral is greater than the image environment threshold value and the ratio of the scattered radiation intensity to be assigned to the pixel to the primary radiation intensity to be assigned to the pixel is greater than the scatter-primary threshold value.

For the determination of a primary radiation line integral mean value to be assigned to the image environment of the respective pixel, the line integral values p(x,y) of the primary radiation (e.g., line integral values after scattered radiation correction) are calculated for a plurality of pixels of the X-ray projection image. The plurality of pixels may be taken from either the entire X-ray projection image or from a subarea thereof to be assigned to the respective pixel. All pixels of the X-ray projection image or of the subarea may be used as the basis, but it is also possible for only a respective subset to be used as the basis. If a subset is used as the basis, this may, for example, be selected at random or may be selected according to a schematic selection rule (e.g., by selecting every nth pixel). A subarea of the X-ray projection image to be assigned to a pixel may, for example, be based on a division of the image into 3×3 rectangular image areas.

The primary radiation line integral values p(x,y) calculated for the plurality of pixels are used as the basis for forming a mean value $p_{Mean}$ and the associated standard deviation $\sigma_{pMean}$. For shadow pixels, a low contribution of primary radiation may be assumed, since a high-contrast object absorbs a high proportion of the primary radiation. Therefore, the primary radiation line integral value p(x,y) is to be large for shadow pixels. As a criterion, the primary radiation line integral value p(x,y) is to be greater than a threshold value formed from the mean value $p_{Mean}$:

$$p(x,y) \geq p_{Mean} + \tau_{op} * \sigma_{pMean}$$

Herein, the factor $\tau_{op}$ may be selected as greater than 1 (e.g., $\tau_{op}=3$). The primary radiation line integrals of pixels that do not represent high-contrast objects (e.g., non-metal pixels) are Gaussian distributed in a good approximation. If a Gaussian distribution is assumed for p(x,y), $\tau_{op}=3$ would provide that the values for shadow pixels would lie outside a 3σ neighborhood of the mean value $p_{Mean}$. It is therefore relatively improbable that the line integral from a pixel that does not map a high-contrast object would lie outside the 3σ neighborhood of the Gauss distribution. However, metal pixels or high-contrast object pixels may have such high line integrals due to the strong absorption of the primary radiation. The optimal $\tau_{op}$ for a specific body region may be obtained empirically by parameter optimization using suitable clinical data, either interactively or in an automated manner (e.g., with deep learning). A suitable value for $\tau_{op}$ may, for example, be found based on previous experience or individual trial and error with respect to the individual X-ray projection image or image data set, or taken from tables or databases.

A development of the present embodiments provides that the determination of shadow pixels also includes, for one or more pixels of the received X-ray projection image: determining a total line integral to be assigned to the respective pixel and/or the primary radiation line integral; comparing the total line integral with a total line integral threshold value and/or the primary radiation line integral with a primary radiation line integral threshold value; and classifying the respective pixel, where the pixel is classified as a shadow pixel if the total line integral and/or the primary radiation line integral is greater than the respective line integral threshold value and the ratio of the scattered radiation intensity to be assigned to the pixel to the primary radiation intensity to be assigned to the pixel is greater than the scatter-primary threshold value.

For shadow pixels, a low total radiation or a low contribution of primary radiation may be assumed since a high-contrast object absorbs a high proportion of the total radiation or primary radiation. Therefore, the line integral values for primary radiation or total radiation for shadow pixels are to be large. As a criterion, the respective value is to be greater than a threshold value.

The respective threshold value may be, for example, five for total radiation or six for primary radiation. The respective threshold value may be determined empirically for each body region of interest based on clinical data. This data may be analyzed interactively or in an automated manner (e.g., with deep learning) in order to determine the respective threshold value. The respective threshold value may be found based on previous experience or by individual trial and error with respect to the individual X-ray projection image or image data set, or taken from tables or databases.

In one embodiment of the method, the determination of shadow pixels also includes, for one or more pixels of the received X-ray projection image: determining a total line integral to be assigned to the pixel; for the respective pixel of the received X-ray projection image, determining a primary radiation line integral to be assigned to the pixel; subtracting the total line integral from the primary radiation line integral; comparing the result of the subtraction with a difference threshold value; and classifying the pixel, where the pixel is classified as a shadow pixel if the difference is greater than the difference threshold value and the ratio of the scattered radiation intensity to be assigned to the pixel to the primary radiation intensity to be assigned to the pixel is greater than the scatter-primary threshold value.

The criterion may be expressed mathematically as:

$$p(x,y) - t(x,y) \geq \tau\_diff$$

For a shadow pixel, the threshold value may be $\tau\_diff=0.7$. This threshold value may be justified mathematically as follows. The difference criterion is equivalent to:

$$\zeta(x,y) = e^{(p(x,y) - t(x,y))} - 1 \geq e^{\tau\_diff} - 1 = \zeta_{Minimum}$$

For a shadow pixel, $\zeta(x,y)$ may be greater than a specific threshold value. For $\tau=0.7$, this results in a value for $\zeta_{Minimum}$ of approximately 1. This numerical value is an example of head data sets, for which $\zeta(x,y)$ values in the range of 0.25 to 0.35 may typically occur. In head data sets, $\zeta(x,y)$, values in the range of 1 or more are typical for metal. For clinical data sets from other body regions (e.g., from the pelvic region), a different $\zeta_{Minimum}$ value may be used. For each body region of interest, it is possible to use corresponding clinical data, which may then be analyzed interactively or in an automated manner (e.g., with deep learning) in order to determine the respective threshold value $\zeta_{Minimum}$.

One development of the present embodiments also makes use of morphological operations in that the determination of shadow pixels also includes one or more of the following acts: classifying or reclassifying a pixel of the received X-ray image as a shadow pixel if a plurality of pixels in the image environment of the pixel are classified as shadow pixels and form a contiguous image area of shadow pixels interrupted by the pixel; classifying or reclassifying a pixel as a non-shadow pixel if a plurality of pixels in the image environment of the pixel are not classified as shadow pixels and form a contiguous image area of non-shadow pixels interrupted by the pixel; enlarging an image area of pixels that are classified as shadow pixels and form a contiguous image area of shadow pixels; or reducing an image area of pixels that are classified as shadow pixels and form a contiguous image area of shadow pixels.

As a result, when the segmentation of one or more high-contrast objects has been provisionally completed, it is possible, for example, for plausibility considerations to be included by, for example, classifying small gaps or individual dots in surrounding contiguous image areas in the same way as the surrounding image areas. If the pixels have already been classified differently, the pixels are reclassified. Therefore, a pixel that has been classified as a shadow pixel would, if appropriate, be reclassified as a non-shadow pixel and vice versa. Herein, contiguous image areas are formed in that all, or at least most, of the pixels in an image area have the same classification (e.g., as shadow pixels or as non-shadow pixels). This results in contiguous image areas in the sense of binary segmentation with a closed, or at least nearly closed, contour. For example, an "opening" operation and/or a "closing" operation may be applied to the segmentation of one or more high-contrast objects or to the high-contrast segmentation.

Pixels classified differently than a contiguous image area that form gaps and dots in the image area may be then assumed to be erroneous outliers if the pixels are so small or insignificant that the pixels cannot plausibly be assumed to be actual image content. For example, gaps formed by individual pixels classified differently may be considered erroneous if the actually achievable resolution in the depiction of the image object is coarser than the pixel size.

In addition, basic tendencies in the segmentation, X-ray projection mapping, or 3D reconstruction of X-ray images may be balanced out compensated, or exploited, in that segmented image areas are basically slightly enlarged or reduced. Whether a basic enlargement (e.g., dilation) or reduction (e.g., erosion) of the segmented image area is advantageous may, for example, be ascertained based on empirical values or by trial and error.

In one development of the present embodiments, it is provided that a projection image that is enhanced with respect to image errors caused by one or more high-contrast objects is generated as a function of an X-ray projection image and a classification of one or more pixels as shadow pixels.

For example, the segmentation generated according to the present embodiments may be used for artifact reduction. Herein, the artifact reduction may, for example, take place according to the procedure described in the introduction. The enhanced segmentation then results in correspondingly enhanced artifact reduction.

In one development of the present embodiments, it is provided that an image data set including a plurality of X-ray projection images is received, enhanced projection images are generated for the X-ray projection images of the image data set, and a 3D result image is reconstructed as a function of the enhanced projection images.

For example, the segmentation generated according to the present embodiments may be used for artifact reduction. The enhanced segmentation then results in correspondingly enhanced artifact reduction. With respect to the reconstruction of 3D result images, herein, it is particularly advantageous that, according to the present embodiments, high-contrast objects are segmented in the X-ray projection images and not in the reconstructed 3D result image. In this way, when enhancing image quality with respect to image errors, it is also possible for account to be taken of high-contrast objects that are not contained or not completely contained in the 3D result image. It is also possible to combine this method with a method that is usual in the prior art for suppressing image errors caused by high-contrast objects. The two methods may be executed sequentially in order to achieve further enhancement of the image quality. Herein, the sequence of the two methods is not important. The two methods may be used independently of one another to determine the shadow pixels of high-contrast objects (e.g., metal objects). It is then possible to form the union of the shadow pixels ascertained independently of one another.

The present embodiments also provide a facility for segmentation of a high-contrast object in an X-ray image configured to perform the method according to the present embodiments including an interface for receiving an X-ray projection image and an image processing processor for determining, for pixels of the received X-ray projection image, whether the respective pixel is a shadow pixel representing a projection mapping of a high-contrast object.

The facility may be a standard computer or workstation for image processing. The facility may be a standard mobile data processing device. The facility may be configured for decentralized performance of the method (e.g., for performance on site). The facility may be configured for centralized performance of the method (e.g., for performance as a computer arranged off site or in a cloud). The results are retrieved by a computer arranged on site.

A development of the present embodiments provides that the facility according to the present embodiments is configured to perform the method according to the present embodiments to generate a 3D result image enhanced with respect to image errors caused by one or more high-contrast objects.

The facility may be an X-ray device with adjustable X-ray projection geometry, a C-arm X-ray device, or a computed tomography device. The facility may also be an image processing computer assigned to or integrated in such an X-ray device.

DETAILED DESCRIPTION

Figure 1:
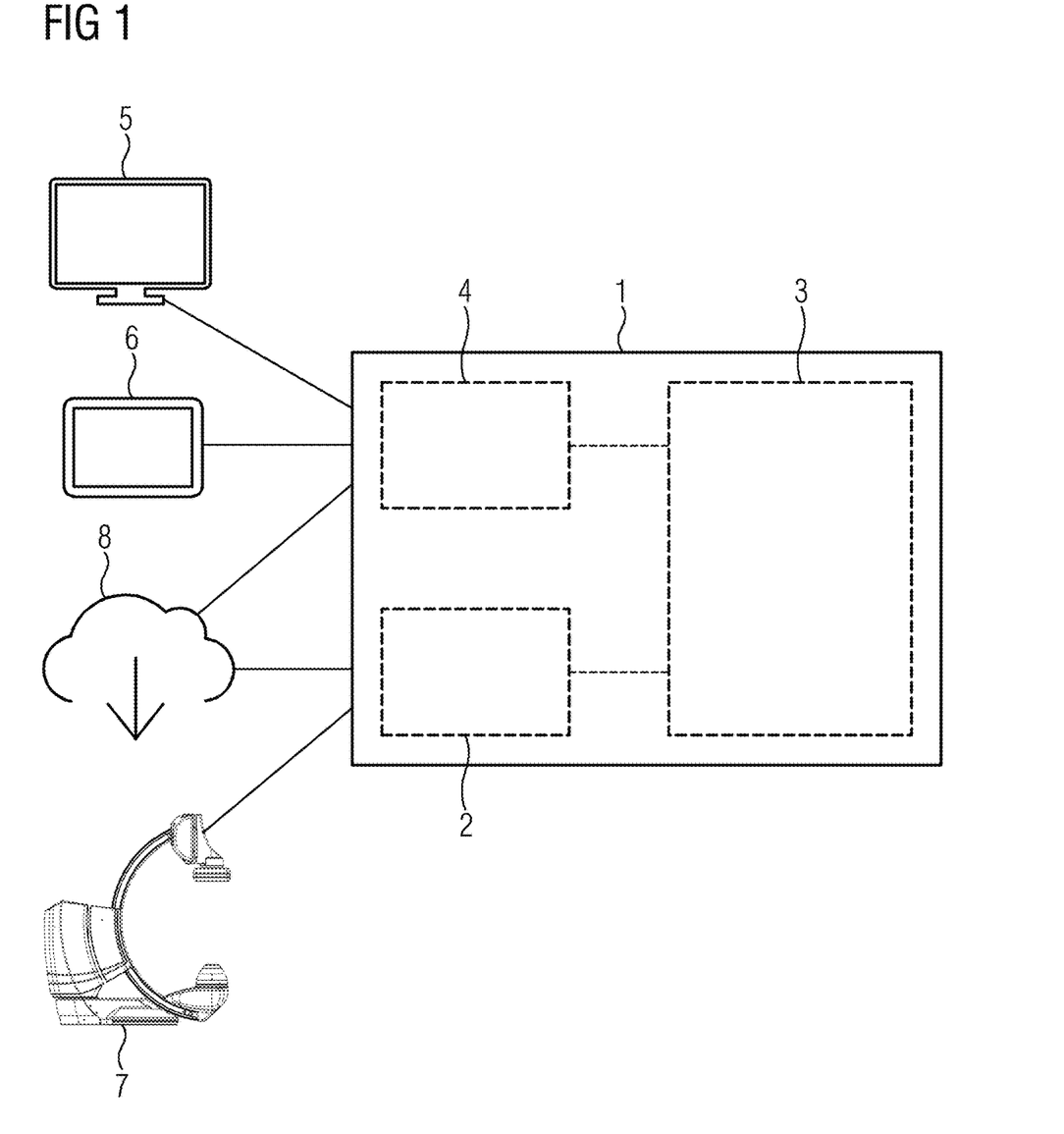
FIG. 1 shows one embodiment of an image processing facility.

FIG. 1 is a schematic depiction of a facility 1 (e.g., device) for segmentation of a high-contrast object in an X-ray image, configured to perform a method according to an embodiment. The facility 1 is a computer configured for image processing. The facility 1 may be a standard computer or a workstation. The facility 1 may also be a standard mobile data processing device.

The facility 1 may be configured for decentralized performance of the method (e.g., for performance on site). The facility 1 may also be configured for centralized performance of the method (e.g., for performance as a computer located off site or in a cloud, where the results are retrieved by a computer arranged on site).

The facility 1 includes an input interface 2 for receiving an X-ray projection image. The input interface 2 may receive a single X-ray projection image or an image data set with a plurality of X-ray projection images. The input interface 2 may receive the image data via a remote data link 8. The input interface 2 may also receive the image data from an X-ray device 7 (e.g., from a C-arm X-ray device or a computed tomography device). The facility 1 itself may also be embodied as an imaging X-ray device.

The facility 1 further includes an image processing processor 3 for determining, for pixels of the received X-ray projection image, whether the respective pixel is a shadow pixel representing a projection mapping of a high-contrast object. The image processing processor 3 is configured to perform the method according to the present embodiments. The image processing processor 3 is embodied to execute a computer program. When the computer program is executed by the image processing processor 3, the acts of the method according to the present embodiments are executed.

The facility 1 further includes an output interface 4. The output interface 4 is configured to transmit data coming from the image processing processor 3 to a receiver device. For example, the output interface 4 may transmit data via the remote data link 8. The output interface 4 may also transmit data to a mobile data processing device 6 or to a screen 5. For example, the output interface 4 may transmit or provide high-contrast segmentation and/or a 3D result image.

An interface facility of the facility 1 includes the input interface 2 and the output interface 4.

Figure 2:
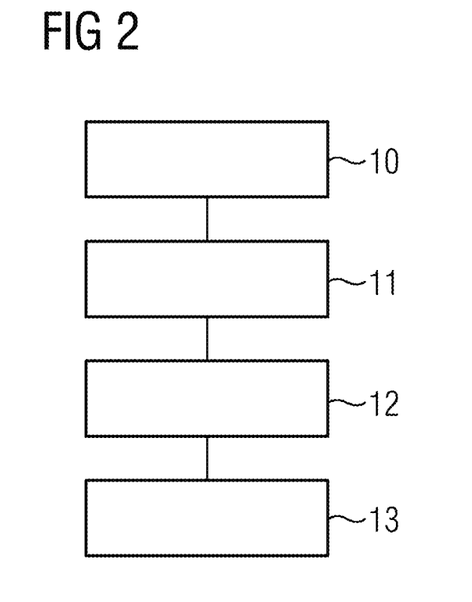
FIG. 2 illustrates one embodiment of a segmentation method.

FIG. 2 explains method acts according to the present embodiments.

In act 10, an X-ray projection image is received through an input interface. The X-ray projection image may, for example, have been recorded by a C-arm X-ray device or by a computed tomography device.

In act 11, an image processing processor determines, for a pixel of the received X-ray projection image, the ratio $\zeta(x,y)$ of the scattered radiation intensity to be assigned to the pixel to the primary radiation intensity to be assigned to the pixel.

In act 12, the ratio determined in act 11 is compared with a scatter-primary threshold value.

In act 13, the pixel is classified as a shadow pixel if the comparison in act 12 reveals that the ratio is greater than the scatter-primary threshold value.

Figure 3:
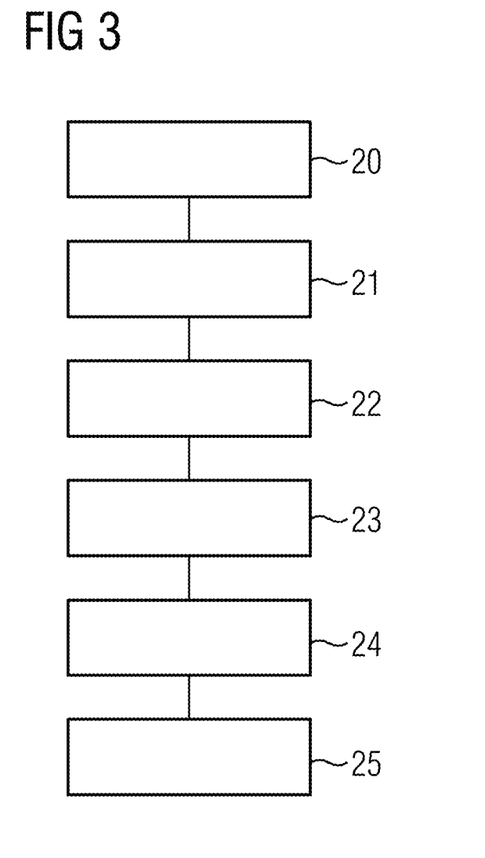
FIG. 3 illustrates one embodiment of a segmentation method with thresholding.

FIG. 3 explains the method with reference to additional further method acts (e.g., for defining a threshold value for the scatter-to-primary radiation ratio (scatter-to-primary ratio)).

In act 20, an input interface receives an X-ray projection image or an image data set containing a plurality of related X-ray projection images. The X-ray projection image may, for example, be recorded by a C-arm X-ray device or by a computed tomography device. The image data set may, for example, be recorded by a C-arm X-ray device or a computed tomography device as a computed tomography image data set.

In act 21, the ratio $\zeta(x,y)$ of the scattered radiation intensity to be assigned to the respective pixel to the primary radiation intensity to be assigned to the pixel is determined for one of the X-ray projection images by an image processing processor for a plurality of pixels.

In act 22, an image area of the X-ray projection image is selected. The image area may be the entire image or a subarea. If a subarea is selected, this may be formed based on a division of the image into tiles or patches. For example, the image may be divided into 3×3 tiles, and each tile forms a subarea.

A subarea may also be formed based on image content. For example, a region of interest may be selected in the image comprising image content that is particularly relevant for a user. The region of interest may then form a subarea or in turn be divided into subareas. Image areas outside the region of interest may then form a further subarea or in turn be divided into subareas.

A subarea may also be formed based on knowledge of a 3D reconstructable image area. If the image belongs to an image data set for computed tomography reconstruction, this is characterized by a limited 3D reconstructable volume. Herein, depending on the projection direction when the X-ray projection image is recorded, image content of each individual X-ray projection image in the image data set may result from objects that are not within or not completely within the 3D reconstructable volume. Image areas with image content that is not within or not completely within the reconstructable volume may form a subarea or in turn be divided into subareas. Image areas with image content that is completely within the reconstructable volume may then form a further subarea or in turn be divided into subareas.

In act 23, a mean value $\zeta_{Mean}$ for the scatter-to-primary radiation ratio is formed for previously formed image areas or subareas thereof. The mean value $\zeta_{Mean}$ is formed based on the scatter-to-primary radiation ratios $\zeta(x,y)$ calculated for a plurality of pixels.

In act 24, a threshold value is formed based on the previously formed mean value $\zeta_{Mean}$ for the scatter-to-primary radiation ratio by multiplying by a factor $\tau_\zeta$. Herein, the factor $\tau_\zeta$ is greater than 1 (e.g., $\tau_\zeta=3$).

The factor $\tau_\zeta$ may be defined for the entire X-ray projection image. However, the factor $\tau_\zeta$ may also be defined individually for one or more image areas or subareas. For example, a different value may be defined for image areas mapping a region of interest than for image areas outside the region of interest. Alternatively, a different value may be defined for image areas that are not in the 3D reconstructable image than for image areas in the 3D reconstructable image.

A suitable value for $\tau_\zeta$ may, for example, be found based on empirical data or previous experience or by individual trial and error with respect to the individual X-ray projection image or image data set, or be taken from tables or databases.

In act 25, the scatter-to-primary radiation ratio $\zeta(x,y)$ of the pixels of an image area or subarea determined previously in act 21 is compared with the associated threshold value formed in act 24. If the ratio is greater than the threshold value, the pixel is classified as a shadow pixel.

Figure 4:
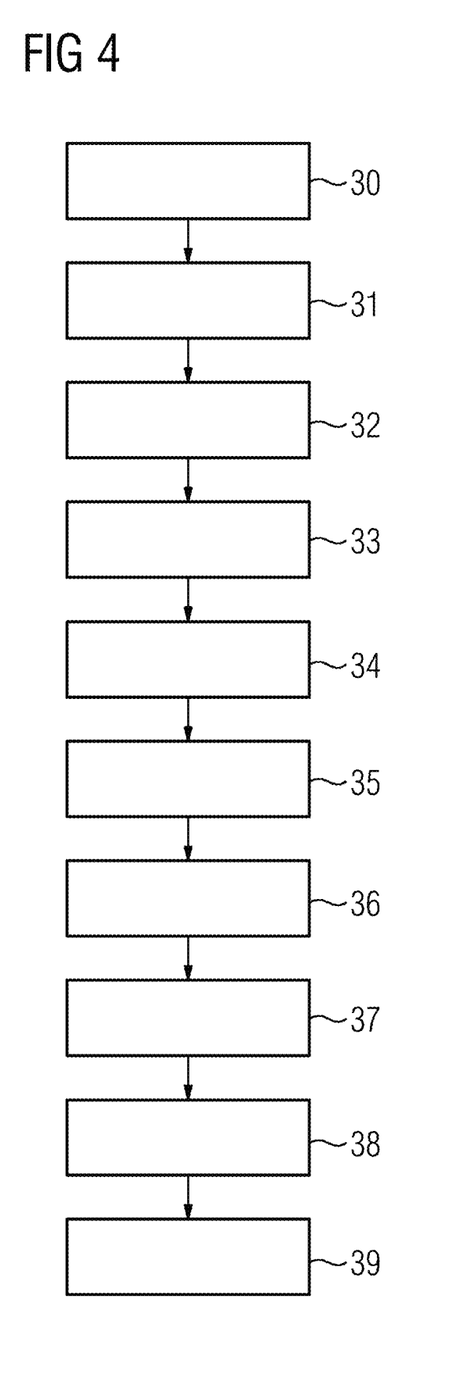
FIG. 4 illustrates one embodiment of a segmentation method with additional criteria.

FIG. 4 explains the method with reference to additional further method acts, for example, with respect to further additional criteria for the classification of shadow pixels.

In act 30, as explained above, an X-ray projection image or an image data set containing a plurality of related X-ray projection images is received through an input interface.

In act 31, as described above, the ratio $\zeta(x,y)$ of the scattered radiation intensity to be assigned to the respective pixel to the primary radiation intensity to be assigned to the pixel is determined for one of the X-ray projection images by an image processing processor for a plurality of pixels.

In act 32, as described above, an image area of the X-ray projection image is selected.

In act 33, as described above, a mean value $\zeta_{Mean}$ for the scatter-to-primary radiation ratio is formed for previously formed image areas or subareas thereof and a threshold value determined based on the mean value.

In act 34, the scatter-to-primary radiation ratio $\zeta(x,y)$ of the pixels of an image area or subarea previously determined in act 31 is compared with the associated threshold value formed in act 33. If the ratio is greater than the threshold value, the pixel is provisionally classified as a shadow pixel.

In act 35, a primary radiation line integral to be assigned to the pixel is ascertained for a pixel of the X-ray projection image.

In act 36, for the image area previously selected in act 32, a plurality of pixels of the image area to which the pixel belongs, a respective primary radiation line integral and, from this, a primary radiation line integral mean value $p_{Mean}$ are ascertained. Further, the standard deviation $\sigma_{pMean}$ associated with the primary radiation line integral mean value is ascertained.

In act 37, an image environment threshold value for the image area is formed as a function of the primary radiation line integral mean value ascertained in act 36 and the associated standard deviation by adding together the primary radiation mean value $p_{Mean}$ and the associated standard deviation $\sigma_{pMean}$, multiplied by a factor $\tau_{op}$. The factor $\tau_{op}$ may, for example, be $\tau_{op}=3$. An optimum value for $\tau_{op}$ may be found based on empirical data or previous experience or individual trial and error with respect to the individual X-ray projection image or image data set, or taken from tables or databases.

In act 38, the primary radiation line integral of the pixels of an image area or subarea ascertained previously in act 35 is compared with the associated image environment threshold value determined in act 37. If the primary radiation line integral is greater than the image environment threshold value, the pixel is provisionally classified as a shadow pixel.

In act 39, it is checked whether a pixel was provisionally classified as a shadow pixel in both previous acts 34 and 38. If so, the pixel is now classified as a shadow pixel.

The preceding sequence places acts 31 to 34 (e.g., scatter-to-primary radiation ratio) before acts 35 to 38 (e.g., primary radiation line integral). However, this sequence is not mandatory. However, the respective characteristic value is ascertained independently of the respective other characteristic value; likewise, the respective criterion is ascertained independently of the respective other criterion. Insofar, the sequence may be interchanged without changing the result (e.g., acts 35 to 38 may also be executed before acts 31 to 34 without changing the result).

Figure 5:
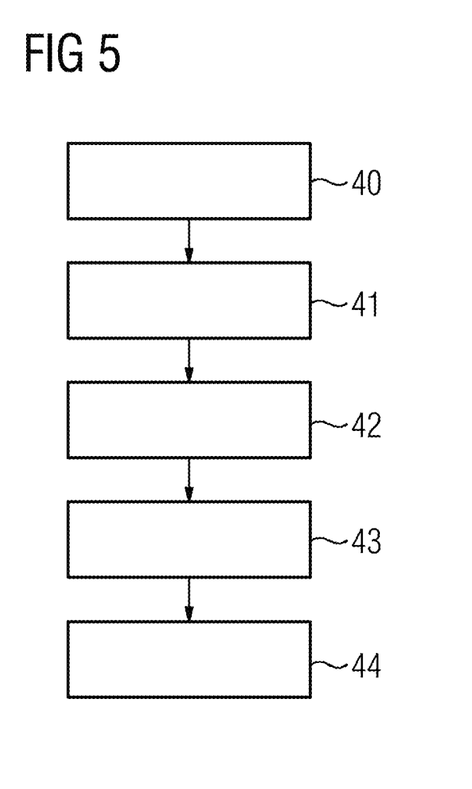
FIG. 5 illustrates one embodiment of a segmentation method with additional optional acts.

FIG. 5 explains the method with reference to additional further method acts. Herein, the acts explained may follow on from the methods explained in the preceding figures. This provides that at least a first classification of shadow pixels has already taken place.

The method acts explained below do not necessarily all have to be executed. Instead, it is also possible for only individual method acts to be executed. Insofar, these method steps may be regarded as optional. Each of the method acts on its own has an influence on the segmentation result independently of the other method acts.

If multiple method acts are executed, the multiple method acts do not mandatorily have to be executed in the sequence described below. Instead, the sequence may also be rearranged.

In act 40, a total line integral is determined for a pixel of the received X-ray projection image. Further, a primary radiation line integral is determined, or the value from one of the preceding acts 31 or 35 is used. Then, the difference between the primary radiation line integral and the total line integral is formed and compared with a difference threshold value. For shadow pixels, the threshold value is set to a value of 0.7, for example. Only if the difference is greater than the difference threshold value will the classification of a pixel as a shadow pixel be confirmed.

In act 41, the binary segmentation of one or more high-contrast objects available from the previous method acts is subjected to additional morphological operations. Consideration is paid to contiguous image areas with pixels that are at least predominantly classified as shadow pixels (e.g., therefore, shadow image areas or high-contrast object image areas). If pixels within such image areas that are not classified as shadow pixels only form small gaps or narrow lines within an otherwise contiguous high-contrast object image area, the pixels will be classified or reclassified as shadow pixels. This applies to gaps or lines that are so small or narrow that it would be implausible to assume that the gaps or lines could be actual image content due to the X-ray projection of an object. This may, for example, be the case if the gaps or lines are smaller than the image resolution or mapping resolution achievable by the X-ray projection mapping.

In act 42, consideration is paid to contiguous image areas with pixels that are at least predominantly not classified as shadow pixels (e.g., therefore, non-shadow image areas or non-high-contrast object image areas). If pixels within such otherwise contiguous image areas that are classified as shadow pixels occur only sporadically or in small areas, the pixels are classified or reclassified as non-shadow pixels.

In act 43, consideration is paid to contiguous image areas with pixels that are at least predominantly classified as high-contrast object image areas. To a small degree, such contiguous image areas may be either enlarged (e.g., dilation) or reduced (e.g., erosion). Whether a dilation or erosion operation is applied and, if so, to what degree may, for example, be defined based on empirical values or by trial and error.

In act 44, the line integrals of pixels that are classified as shadow pixels are replaced with interpolated values according to the procedure explained in the introduction. The interpolated gray values may be ascertained depending on the gray values of respective adjacent pixels that are not classified as shadow pixels. As a result of act 44, an X-ray projection image is provided in which the high-contrast object image areas have been replaced with image areas with gray values corresponding to the gray values of the respective image environment. If these images are used as an image data set for the 3D reconstruction of an image, the result of the 3D reconstruction is a 3D image with reduced artifacts caused by high-contrast objects. In other words, thus, metal artifact reduction has been performed.

To obtain optimal results with the methods explained above, the parameter values used in the method are to be optimized. For example, the parameter values used in the threshold values are to be optimized. Herein, the clinical data used for all body regions of interest is analyzed interactively or in an automated manner in order to ascertain the respective threshold values. Herein, the criteria are that (a) shadow pixels are also correctly classified as shadow pixels with high reliability; and that (b) non-shadow pixels are only incorrectly classified as shadow pixels with very low probability. This optimization may be based on clinical data.

Parameter optimization is to provide that all high-contrast objects or metal objects within or outside the 3D reconstructable image area are identified. Conversely, all other image areas are to be identified as non-high-contrast objects. Individual parameter values for the various body regions are to be imaged by X-ray projection. Herein, a separate set of parameter values is to be provided for each body region.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for segmentation of a high-contrast object in an X-ray image, the computer-implemented method comprising:

receiving an X-ray projection image through an interface, wherein the X-ray projection image comprises a plurality of pixels;

determining, by an image processing processor, for one or more pixels of the received X-ray projection image, whether a respective pixel of the one or more pixels is a shadow pixel representing a projection mapping of a high-contrast object; and generating high-contrast object segmentation of one or more high-contrast objects for the X-ray projection image based on the shadow pixels, wherein determining whether the respective pixel is a shadow pixel comprises:

for the respective pixel of the received X-ray projection image, determining a ratio of a scattered radiation intensity to be assigned to the respective pixel to a primary radiation intensity to be assigned to the respective pixel;

comparing the ratio with a scatter-primary threshold value; and classifying the respective pixel, wherein the respective pixel is classified as a shadow pixel when the ratio is greater than the scatter-primary threshold value.

2. The method of claim 1, further comprising:

for at least two pixels of the received X-ray projection image or of a subarea of the received X-ray projection image, determining the ratio of the scattered radiation intensity to be assigned to the respective pixel to the primary radiation intensity to be assigned to the pixel;

determining a mean value of the ratios calculated for the at least two pixels; and determining the scatter-primary threshold value as a function of the mean value.

3. The method of claim 1, further comprising:

for one or more pixels of the received X-ray projection image, determining a primary radiation line integral to be assigned to the respective pixel;

determining a primary radiation line integral mean value to be assigned to an image environment of the respective pixel;

determining a standard deviation to be assigned to the primary radiation line integral mean value;

determining an image environment threshold value, the determining of the image environment threshold value comprising adding together the primary radiation line integral mean value and the standard deviation;

comparing the primary radiation line integral with the image environment threshold value;

classifying the respective pixel, wherein the pixel is classified as a shadow pixel when the primary radiation line integral is greater than the image environment threshold value and the ratio of the scattered radiation intensity to be assigned to the pixel to the primary radiation intensity to be assigned to the pixel is greater than the scatter-primary threshold value.

4. The method of claim 1, further comprising:

for one or more pixels of the received X-ray projection image, determining a total line integral to be assigned to the respective pixel;

comparing the total line integral with a total line integral threshold value;

only classifying the respective pixel as a shadow pixel when the total line integral is greater than the total line integral threshold value and the ratio of the scattered radiation intensity to be assigned to the pixel to the primary radiation intensity to be assigned to the pixel is greater than the scatter-primary threshold value.

5. The method of claim 1, further comprising:

for one or more pixels of the received X-ray projection image, determining a total line integral to be assigned to the pixel;

for the respective pixel of the received X-ray projection image, determining a primary radiation line integral to be assigned to the pixel;

subtracting the total line integral from the primary radiation line integral;

comparing a result of the subtraction with a difference threshold value; and classifying the pixel, wherein the pixel is classified as a shadow pixel when the result of the subtraction is greater than the difference threshold value and the ratio of the scattered radiation intensity to be assigned to the pixel to the primary radiation intensity to be assigned to the pixel is greater than the scatter-primary threshold value.

6. The method of claim 1, further comprising:

classifying or reclassifying a pixel of the received X-ray image as a shadow pixel when a plurality of pixels in the image environment of the pixel are classified as shadow pixels and form a contiguous image area of shadow pixels interrupted by the pixel;

classifying or reclassifying a pixel as a non-shadow pixel when a plurality of pixels in the image environment of the pixel are not classified as shadow pixels and form a contiguous image area of non-shadow pixels interrupted by the pixel;

enlarging an image area of pixels that are classified as shadow pixels and form a contiguous image area of shadow pixels;

reducing an image area of pixels that are classified as shadow pixels and form a contiguous image area of shadow pixels; or any combination thereof.

7. The method of claim 1, further comprising generating a projection image enhanced with respect to image errors caused by one or more high-contrast objects as a function of an X-ray projection image and a classification of one or more pixels as shadow pixels.

8. The method of claim 7, further comprising:

receiving an image data set comprising a plurality of X-ray projection images;

generating enhanced projection images for the plurality of X-ray projection images of the image data set; and reconstructing a three-dimensional (3D) result image as a function of the enhanced projection images.

9. In a non-transitory computer-readable storage medium that stores instructions executable by one or more processors for segmentation of a high-contrast object in an X-ray image, the instructions comprising:

receiving an X-ray projection image through an interface, wherein the X-ray projection image comprises a plurality of pixels;

determining, by an image processing processor, for one or more pixels of the received X-ray projection image, whether a respective pixel of the one or more pixels is a shadow pixel representing a projection mapping of a high-contrast object; and generating high-contrast object segmentation of one or more high-contrast objects for the X-ray projection image based on the shadow pixels, wherein determining whether the respective pixel is a shadow pixel comprises:
for the respective pixel of the received X-ray projection image, determining a ratio of a scattered radiation intensity to be assigned to the respective pixel to a primary radiation intensity to be assigned to the respective pixel;
comparing the ratio with a scatter-primary threshold value; and
classifying the respective pixel, wherein the respective pixel is classified as a shadow pixel when the ratio is greater than the scatter-primary threshold value.

10. The non-transitory computer-readable storage medium of claim 9, wherein the instructions further comprise:
for at least two pixels of the received X-ray projection image or of a subarea of the received X-ray projection image, determining the ratio of the scattered radiation intensity to be assigned to the respective pixel to the primary radiation intensity to be assigned to the pixel;
determining a mean value of the ratios calculated for the at least two pixels; and
determining the scatter-primary threshold value as a function of the mean value.

11. The non-transitory computer-readable storage medium of claim 9, wherein the instructions further comprise:
for one or more pixels of the received X-ray projection image, determining a primary radiation line integral to be assigned to the respective pixel;
determining a primary radiation line integral mean value to be assigned to an image environment of the respective pixel;
determining a standard deviation to be assigned to the primary radiation line integral mean value;
determining an image environment threshold value, the determining of the image environment threshold value comprising adding together the primary radiation line integral mean value and the standard deviation;
comparing the primary radiation line integral with the image environment threshold value;
classifying the respective pixel, wherein the pixel is classified as a shadow pixel when the primary radiation line integral is greater than the image environment threshold value and the ratio of the scattered radiation intensity to be assigned to the pixel to the primary radiation intensity to be assigned to the pixel is greater than the scatter-primary threshold value.

12. The non-transitory computer-readable storage medium of claim 9, wherein the instructions further comprise:
for one or more pixels of the received X-ray projection image, determining a total line integral to be assigned to the respective pixel;
comparing the total line integral with a total line integral threshold value; and
only classifying the respective pixel as a shadow pixel when the total line integral is greater than the total line integral threshold value and the ratio of the scattered radiation intensity to be assigned to the pixel to the primary radiation intensity to be assigned to the pixel is greater than the scatter-primary threshold value.

13. The non-transitory computer-readable storage medium of claim 9, wherein the instructions further comprise:

for one or more pixels of the received X-ray projection image, determining a total line integral to be assigned to the pixel;
for the respective pixel of the received X-ray projection image, determining a primary radiation line integral to be assigned to the pixel;
subtracting the total line integral from the primary radiation line integral;
comparing a result of the subtraction with a difference threshold value; and
classifying the pixel, wherein the pixel is classified as a shadow pixel when the result of the subtraction is greater than the difference threshold value and the ratio of the scattered radiation intensity to be assigned to the pixel to the primary radiation intensity to be assigned to the pixel is greater than the scatter-primary threshold value.

14. The non-transitory computer-readable storage medium of claim 9, wherein the instructions further comprise:
classifying or reclassifying a pixel of the received X-ray image as a shadow pixel when a plurality of pixels in the image environment of the pixel are classified as shadow pixels and form a contiguous image area of shadow pixels interrupted by the pixel;
classifying or reclassifying a pixel as a non-shadow pixel when a plurality of pixels in the image environment of the pixel are not classified as shadow pixels and form a contiguous image area of non-shadow pixels interrupted by the pixel;
enlarging an image area of pixels that are classified as shadow pixels and form a contiguous image area of shadow pixels;
reducing an image area of pixels that are classified as shadow pixels and form a contiguous image area of shadow pixels; or
any combination thereof.

15. The non-transitory computer-readable storage medium of claim 9, wherein the instructions further comprise generating a projection image enhanced with respect to image errors caused by one or more high-contrast objects as a function of an X-ray projection image and a classification of one or more pixels as shadow pixels.

16. The non-transitory computer-readable storage medium of claim 15, wherein the instructions further comprise:
receiving an image data set comprising a plurality of X-ray projection images;
generating enhanced projection images for the plurality of X-ray projection images of the image data set; and
reconstructing a three-dimensional (3D) result image as a function of the enhanced projection images.

17. A facility for segmentation of a high-contrast object in an X-ray image, the facility comprising:
an interface configured to receive an X-ray projection image; and
an image processing processor configured to:
determine, for pixels of the received X-ray projection image, whether the respective pixel is a shadow pixel representing a projection mapping of a high-contrast object; and
generate high-contrast object segmentation of one or more high-contrast objects for the X-ray projection image based on the shadow pixels,
wherein the determination of whether the respective pixel is a shadow pixel comprises:

for the respective pixel of the received X-ray projection image, determination of a ratio of a scattered radiation intensity to be assigned to the respective pixel to a primary radiation intensity to be assigned to the respective pixel;

comparison of the ratio with a scatter-primary threshold value; and classification of the respective pixel, wherein the respective pixel is classified as a shadow pixel when the ratio is greater than the scatter-primary threshold value.

18. The facility of claim 17, wherein the interface is further configured to receive an image data set comprising a plurality of X-ray projection images, and wherein the image processing processor is further configured to:

generate enhanced projection images for the plurality of X-ray projection images of the image data set; and reconstruct a three-dimensional (3D) result image as a function of the enhanced projection images.

* * * * *